Jan. 18, 1927.

L. BRANDT 1,615,162

BRAID SPREADING MACHINE

Filed Feb. 17, 1926 3 Sheets-Sheet 1

WITNESSES

INVENTOR
Louis Brandt
BY
ATTORNEYS

Jan. 18, 1927.

L. BRANDT 1,615,162

BRAID SPREADING MACHINE

Filed Feb. 17, 1926 3 Sheets-Sheet 2

WITNESSES

INVENTOR
*Louis Brandt*
BY
ATTORNEYS

Jan. 18, 1927.　　　　　　　　　　　　　　　　1,615,162
L. BRANDT
BRAID SPREADING MACHINE
Filed Feb. 17, 1926　　　　3 Sheets-Sheet 3
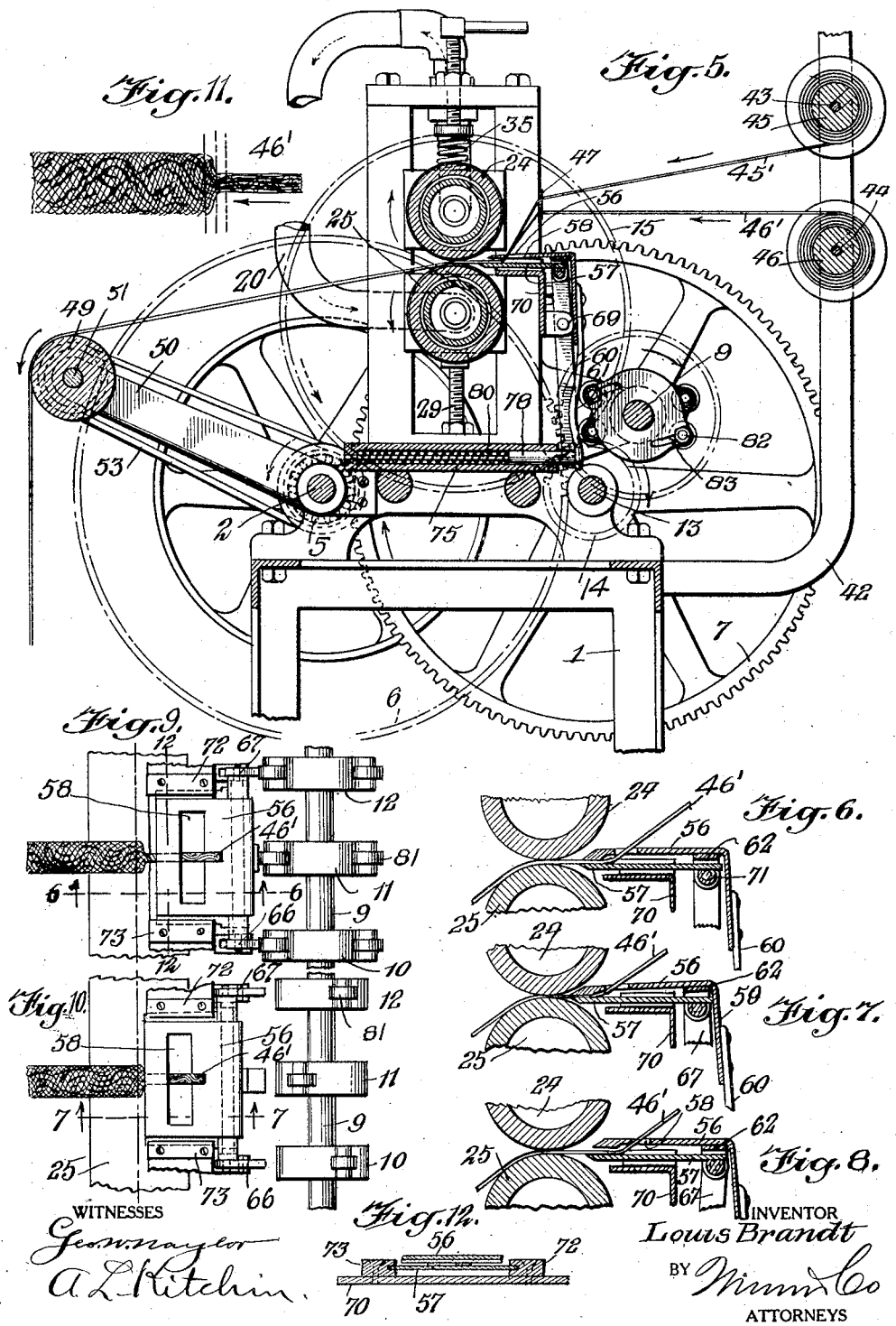
WITNESSES
INVENTOR
Louis Brandt
BY
ATTORNEYS Patented Jan. 18, 1927.

1,615,162

UNITED STATES PATENT OFFICE.

LOUIS BRANDT, OF NEW YORK, N. Y.

BRAID-SPREADING MACHINE.

Application filed February 17, 1926. Serial No. 88,885.

This invention relates to braid spreading machines and has for an object to provide an improved construction wherein braid may be spread to different widths according to the way the machine is set.

Another object of the invention is to provide a braid spreading machine wherein one or a comparatively large number of braids may be spread simultaneously and spread quickly.

A further object, more specifically, is to provide a braid spreading machine wherein jaws are provided for gripping the braid and forcing the same into a spread condition, the structure being such that the amount of spreading is in proportion to the forcing action of the jaws.

In the accompanying drawings—

Figure 5 is a sectional view through Figure 3 on line 5—5.

Figure 6 is a detail fragmentary sectional view taken on line 6—6 of Figure 9.

Figure 7 is a detail fragmentary sectional view taken on line 7—7 of Figure 10.

Figure 8 is a view similar to Figure 6 but showing the jaw immediately before it is closed.

Figure 9 is a top plan view of the jaw shown in Figure 6 together with the operating cams therefor and one of the rollers.

Figure 10 is a view similar to Figure 9 but showing the jaw moved to what may be termed a spreading position.

Figure 11 is an enlarged fragmentary plan view of a section of braid showing part spread and part unspread.

Figure 12 is an enlarged fragmentary sectional view through Figure 9 on line 12—12.

Figure 1:
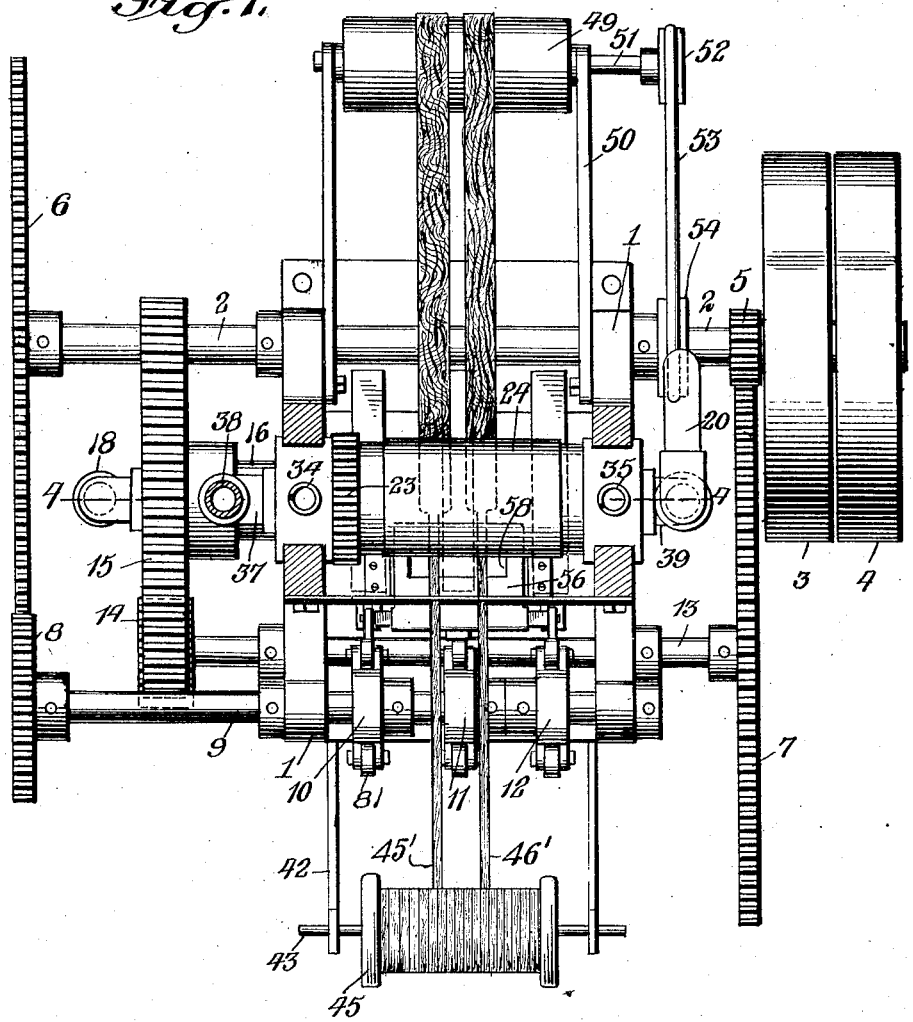
Figure 1 is a sectional view through Figure 3 on line 1—1.

Referring to the accompanying drawings by numerals, 1 indicates a frame which may be cast or otherwise formed and is provided with sufficient structure to support the various rollers, shafts and other parts of the machine. As shown particularly in Figure 1, a power shaft 2 is mounted in the frame 1 and carries pulleys 3 and 4, one of which is a loose pulley. The shaft 2 carries a pinion 5 near one end and a large gear wheel 6 at the opposite end, pinion 5 meshing with gear wheel 7 and gear wheel 6 meshing with pinion 8. The pinion 8 is rigidly secured to the cam shaft 9 which rotates the various cams 10, 11 and 12. The gear wheel 7 is secured to a shaft 13 which carries a pinion 14 and which pinion is rotated thereby, said pinion meshing with the gear wheel 15. The gear wheel 15 is rigidly secured to a sleeve 16 loosely mounted on the bearing tube 17 which has threaded thereto tubular elbows 18 and 19, elbow 19 being adapted to receive steam from the pipe 20 while elbow 18 directs the steam to a suitable discharge point through the pipe 21. A gear 22 is rigidly secured to the sleeve 16 and continually meshes with gear 23. The teeth of the gear wheels 22 and 23 are preferably longer than ordinary gear teeth whereby the rollers 24 and 25 may be adjusted toward and away from each other. It will be noted that the roller 25 is a tubular structure welded or otherwise secured to the sleeve 16 and also welded or otherwise secured to the sleeve 16'. The sleeves 16 and 16' are carried by bearing sleeves or boxes 26 and 27, said bearing boxes being adjustably supported by the screws 28 and 29 whereby the parts may be raised and lowered within certain limits. The roller 24 is welded or otherwise rigidly secured to the sleeves 30 and 31, said sleeves being rotatably mounted in bearing boxes 32 and 33, said bearing boxes being continually pressed downwardly by the springs 34 and 35 whereby a proper tension is maintained between the rollers 24 and 25.

It will be noted that gear wheel 22 is rigidly secured to sleeve 16 and gear wheel 23 is rigidly secured to sleeve 30 whereby the rollers 24 and 25 will operate in unison. Steam is let into the tubular bearings 36 through the elbow 37 which is threaded therein, said elbow receiving steam from the pipe 38 and exhausting steam through the elbow 39 into pipe 20. The respective springs 34 and 35 are held under tension by the hand operated screws 40 and 41, which screws are carried by the frame 1. It will be understood that the pipe 38 receives steam from any suitable source and the steam is maintained at any desired pressure so that the rollers 24 and 25 will be heated always to the desired extent.

Mounted on the frame 1 is a bracket 42 of any desired construction, said bracket carrying shafts 43 and 44 on which rollers 45 and 46 are mounted, said rollers carrying supplies of braid which are threaded through the guide 47 and from thence extend through the jaws 48 and from the jaws the braid extends between the rollers 24 and 25 and finally over the roller 49 to a suitable receiving point. The roller 49 is rotatably mounted in the arms 50 which are bolted or otherwise secured to frame 1. This roller is rigidly secured to a shaft 51 which is rotatably mounted in the arms 50 and which carries a pulley 52 at one end. Pulley 52 accommodates the belt 53 which belt passes over a second pulley 54, said second pulley being rigidly secured to the shaft 2 whereby the roller 49 will be rotated at the proper speed as the machine operates.

The guide 47 is provided with a number of openings 55 through which the various braids 45' and 46' extend. It will be noted that the braids are made comparatively narrow and pass from their supply of rollers in the narrow condition through the guide 47 and then are spread to the desired extent by the jaws 48 and associated parts so that the braid, when ready for the market, will appear as shown at the left end of Figure 11.

Figure 2:
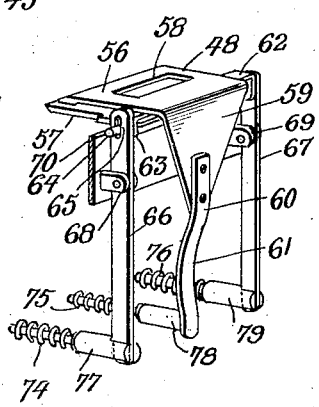
Figure 2 is a detail perspective view of a pair of gripping jaws and associated parts disclosing certain features of the invention.
Figure 3:
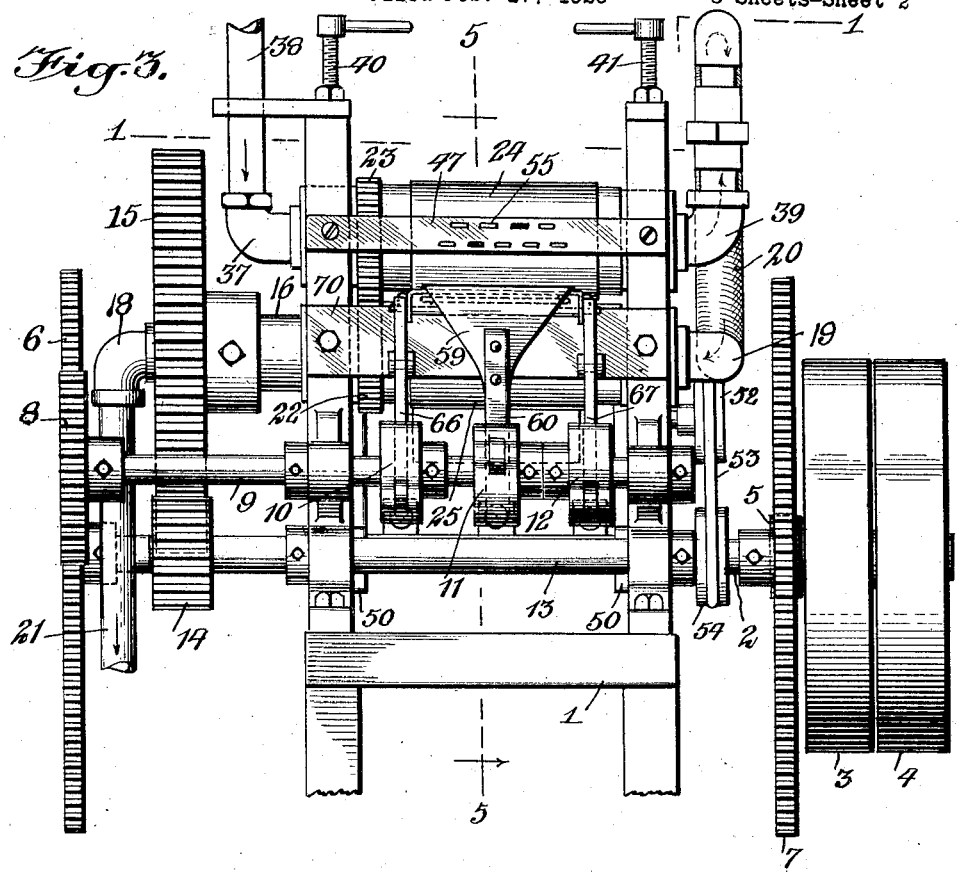
Figure 3 is an elevation of a braid spreading machine embodying the invention.
Figure 4:
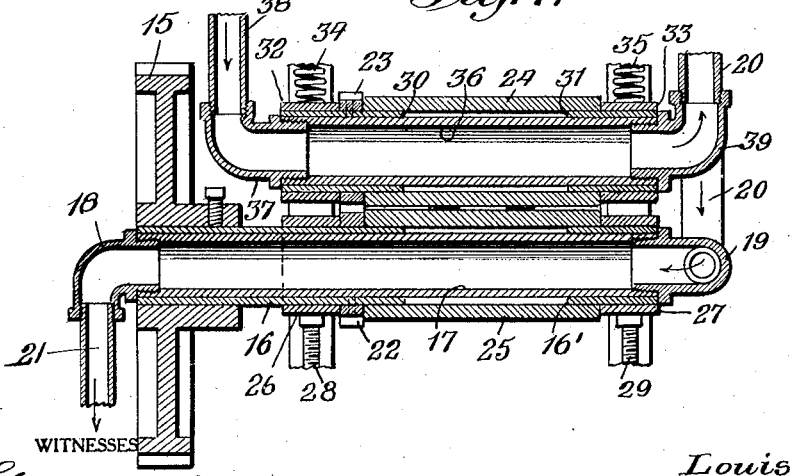
Figure 4 is a fragmentary sectional view through Figure 1 on line 4—4.

When the machine is in operation, the rollers 24 and 25 are sufficiently close together to squeeze the braid and press the same to a fixed position. Also in operation, as hereinafter fully described, the jaws 48 grip the braid and force the the same toward the rollers while the rollers are moving at a uniform speed. As a second step or operation, the jaws move back and again force another supply toward the rollers. The forcing of the braid by the jaws toward the rollers causes the same to spread laterally as illustrated in Figures 9 to 11 inclusive and then the rollers act to pull the spread braid and press the same into final or permanent shape. The jaws are preferably constructed as shown particularly in Figure 2 from which figure it will be noted that the jaws 48 are formed with an upper jaw plate 56 and a lower jaw plate 57, plate 56 having slot 58 extending from near one side to near the other side. It will also be noted that jaw plate 56 is provided with a turned or bent down portion 59 to which is secured a bar or rod 60 having an arc-shaped section 61. A plate or bar 62 is riveted, welded or otherwise secured to the jaw plate 56 and is provided with turned down ends 63 which carry a journal shaft 64 extending an appreciable distance beyond the jaw plate and through the slots 65 in the levers 66 and 67, which levers are pivotally mounted at 68 and 69 on a stationary portion 70 of frame 1. By reason of this construction, the entire jaw structure pivots or swings on the pivotal supports 68 and 69 while jaw plate 56 swings to a limited extent independently on the journal pin 64. The jaw plate 57 is provided with a tubular member 71 (Figure 6) which is rotatably mounted on the shaft 64 so that the jaw plate 57 may also have an independent swinging movement within certain limits. This structure is provided in order that the jaw plates 56 and 57 may move back and forth substantially in a straight line as the levers 66 and 67 swing on their pivotal supports. As this action takes place, the shaft 64 will in effect, move up and down in the respective slots 65. Jaw plate 57 is arranged with its side edges extending into grooved guides 72 and 73 carried by the member or portion 70. In this way, the jaw plate 57 may readily slide back and forth as well as jaw plate 56 while jaw plate 56 may swing independently and jaw plate 57 slide always in the same plane regardless of the swinging movement of jaw plate 56. Springs 74, 75 and 76 are positioned to actuate levers 60, 66 and 67 independently, said springs preferably co-acting with the guiding members 77, 78 and 79, which members are mounted to slide in the various tubular members 80. The various springs 74 to 76 inclusive act on one end of the tubular member 80 and at the opposite end act on the members 77 to 79 inclusive for individually urging these member and the respective levers associated therewith. Co-acting with the levers 60, 66 and 67 are cams 10, 11 and 12, each cam being preferably provided with a pair of rollers 81. These rollers may be journaled in suitable projections on the cams or may be journaled in suitable shafts 82 extending through slots 83. When the latter is the case, the shafts 82 are rigidly bolted in any desired position along the slots 83 and, consequently, cause the rollers to be spaced near or further from the center of shaft 9. The rollers 81 are arranged on diametrically opposite sides of the respective cams and when the slots 83 are used, the rollers must all be adjusted the same distance from the center of shaft 89. This is in order to cause a proper throw or movement of the jaw structure 48. By varying the position of the axles 82, the jaw structure may vary its throw.

In Figure 5 it will be observed that the cam 11 is further advanced than the other two cams, so that the cam acting on the arc-shaped portion 61 holds the jaw open until the jaw structure has moved back to the position shown in Figure 8 whereupon the cam 11 will leave the lever 60 slightly in advance of the time that the cams 10 and 12 will leave the levers 66 and 67. When this occurs, springs 75 will immediately function to quickly move the jaw plate 56 to the position shown in Figure 6 and then springs 74 and 76 will begin to function with spring 75 to move the parts to the position shown in Figure 7. It will be noted that the first movement is to cause jaw plate 56 to press against the braid and the second movement is to cause both jaw plates to move simultaneously to the position shown in Figure 7. This is caused by the anti-friction wheels 81 on cam 11 leaving the lever 60 slightly before the other levers are released, though to the eye it would appear as if they left substantially simultaneously. As the jaws move from the position shown in Figure 6 to that shown in Figure 7, the braid is forced toward the rollers at a much higher rate of speed than the rollers and, consequently, the braid is spread to an appreciable extent and passes beneath the rollers in this spread condition. It is to be observed that the braid is being continually crowded toward the rollers and spread as it is crowded so that the braid is one width as it passes through slot 58 and is much wider as it leaves the rollers.

What I claim is:

1. A braid spreading machine including a pair of pressing rollers, and reciprocating means for intermittently crowding the braid toward the rollers as the rollers function.

2. In a braid spreading machine a pair of pressing rollers, means for rotating said rollers, a reciprocating structure for crowding braid through said rollers as the rollers function, and means for causing said reciprocating structure to crowd a sufficient quantity of braid to the rollers to cause a spreading action thereof whereby the braid will be wider when it leaves the rollers than before the crowding action.

3. In a braid spreading machine a pair of rollers, a pair of reciprocating jaws for gripping and crowding braid to a position adjacent the rollers, and means for causing said jaws to function at a speed that will maintain a crowded condition of the braid adjacent the rollers.

4. In a braid spreading machine a pair of rollers, means for heating the rollers, means for guiding the braid to the rollers, a reciprocating jaw structure positioned to grip the braid near the rollers and crowd the same toward the rollers so as to spread the braid immediately before it passes between the rollers, and means for causing the jaw structure to function at a speed commensurate to the speed of the rollers whereby there will always be a supply of spread braid near the rollers during the operation of the rollers.

5. In a braid spreading machine, a pair of pressing rollers, means for guiding braid to the rollers, a reciprocating jaw structure for gripping the braid intermittently and forcing the same toward the rollers, power actuated means for causing the jaw structure to function in one direction, and spring means for causing the jaw structure to function in the opposite direction.

6. In a braid spreading machine a reciprocating intermittently actuated device for spreading braid at a given point as it passes through the machine, and means co-acting therewith for pressing the braid in its spread condition.

7. In a braid spreading machine, a jaw structure acting to feed braid to a given point and spread the braid at the same time, said jaw structure including a pair of swinging and substantially sliding jaws, means for opening the jaws and substantially simultaneously swinging the same back to a predetermined position, and means for closing said jaws and then moving the jaws forward to feed forward a quantity of braid and at the same time spread the same.

8. In a braid spreading machine a pair of rotating rollers and means for feeding braid toward the rollers and in the feeding causing the braid to be spread, said means including a reciprocating jaw plate, a pivotally mounted jaw plate co-acting with the first mentioned jaw plate, levers for actuating both of said jaw plates, cams for moving the jaw plates in one direction, and springs for moving the jaw plates to a closed position and in the opposite direction, said springs acting to quickly force the braid toward the rollers so as to spread the braid.

9. In a braid spreading machine a pair of rotating rollers, means for guiding braid to said rollers and means for intermittently feeding the braid to the rollers, said feeding action being sufficiently fast in respect to the speed of the rollers to crowd the braid against the rollers and spread the same simultaneously, said means including a pair of jaw plates, levers connected with said jaw plates, spring means acting on the levers to cause the jaw plates to close and then move quickly toward the rollers, and a cam for each of the levers acting to open the jaw plates and then move the jaw plates simultaneously back a predetermined distance.

LOUIS BRANDT.